(12) United States Patent
Bartow

(10) Patent No.: US 12,304,328 B2
(45) Date of Patent: May 20, 2025

(54) PRODUCT INTEGRATED MANUFACTURING OF EMISSION FREE VEHICLES

(71) Applicant: Industrial Project Innovation, Greenville, SC (US)

(72) Inventor: Douglas Herbert Bartow, Signal Mountain, TN (US)

(73) Assignee: Industrial Project Innovation, Greenville, SC (US)

( * ) Notice: Subject to any disclaimer, the term of this patent is extended or adjusted under 35 U.S.C. 154(b) by 320 days.

(21) Appl. No.: 18/050,953

(22) Filed: Oct. 28, 2022

(65) Prior Publication Data

US 2023/0135613 A1 May 4, 2023

Related U.S. Application Data

(60) Provisional application No. 63/274,627, filed on Nov. 2, 2021.

(51) Int. Cl.
*B60L 50/50* (2019.01)
*B60L 15/20* (2006.01)
*B60W 30/16* (2020.01)

(52) U.S. Cl.
CPC ............. *B60L 50/50* (2019.02); *B60L 15/20* (2013.01); *B60W 30/16* (2013.01); *B60L 2240/12* (2013.01); *B60L 2240/622* (2013.01)

(58) Field of Classification Search
CPC ...... B60L 50/50; B60L 15/20; B60L 2240/12; B60L 2240/622; B60L 50/66; B60W 30/16; B62D 65/02; B62D 65/024; B62D 65/14
See application file for complete search history.

(56) References Cited

U.S. PATENT DOCUMENTS

| | | | |
|---|---|---|---|
| 4,422,685 A * | 12/1983 | Bonfilio | B62D 65/04 296/193.04 |
| 6,836,943 B2 | 1/2005 | Chernoff et al. | |
| 7,028,791 B2 * | 4/2006 | Chernoff | B60T 1/065 454/69 |
| 8,496,078 B2 * | 7/2013 | Wellborn | G05D 1/0234 701/96 |
| 8,757,309 B2 | 6/2014 | Schmitt et al. | |
| 10,569,663 B2 | 2/2020 | Webb | |
| 2019/0344834 A1 * | 11/2019 | Dagström | B62D 25/081 |
| 2020/0070639 A1 * | 3/2020 | Bohmer | B62D 21/07 |
| 2020/0324637 A1 | 10/2020 | Hammond et al. | |
| 2020/0369140 A1 * | 11/2020 | McCarron | B60G 3/18 |
| 2021/0101641 A1 | 4/2021 | Kim et al. | |
| 2021/0394845 A1 * | 12/2021 | Thomas | G05D 1/0291 |
| 2022/0055701 A1 * | 2/2022 | Faga | B62D 65/04 |
| 2022/0089237 A1 * | 3/2022 | Sverdlov | B25J 9/1697 |
| 2022/0355636 A1 * | 11/2022 | Harmon | B62D 63/025 |

\* cited by examiner

*Primary Examiner* — Jason D Shanske
*Assistant Examiner* — James J Triggs

(57) ABSTRACT

The present invention provides a method and system that comprise steps of powering on a skateboard, limiting speed of vehicle by a production mode program, initiating control route for all vehicles, receiving inputs, transporting the skateboard to a paint shop location, attaching a cabin to the skateboard, utilizing one or more post marriage stationary lift station(s), transporting the cabin with skateboard, installing the cabin attached components, routing completed vehicles through vehicle test stations to confirm function and build quality and removing the production mode from the vehicle and vehicle can be driven to shipment area autonomously.

20 Claims, 6 Drawing Sheets

PRODUCT INTEGRATED MANUFACTURING OF EMISSION FREE VEHICLES

FIELD OF THE INVENTION

The present invention relates generally to a method and system of manufacturing emission free vehicles. More specifically, the present invention substantially reduces capital investment and operational cost and creates other advantages for original equipment manufacturers (OEMs) or customers by reduction of assembly conveyance equipment and flexibility of skateboard or vehicle routes.

BACKGROUND OF THE INVENTION

No or low emission vehicles such as Battery Electric Vehicles (BEVs) are increasing in popularity and manufacturers of electric vehicles are integrating these vehicles into existing factories, production lines, or constructing production facilities to build BEVs. Some OEMs are changing from Unit-Body vehicle construction designs typical of a passenger car or sport utility vehicles (SUVs) to various Body-on-Frame designs and integrating components that enable steering, braking, acceleration/deceleration, vehicle height adjustment (suspension), horn/alarm with wireless control plus integrating high-capacity batteries, battery enclosures, suspension, wheels, tires, and other components. These integrated frame designs are often referred to in the industry as skateboards. Some OEMs which use Body-on-Frame construction today for pick-up trucks and heavy-duty commercial vehicles are converting to similar skateboard designs to produce electric vehicles. These low-profile skateboards are self-contained or nearly self-contained and create the potential of traveling through the top-hat/cabin assembly processes or other locations on a route map without or with less conveyance equipment. Today, that potential has not been considered or realized and facilities continue to plan and install traditional conveyance systems.

An objective of the present invention is to provide a vehicle manufacturing method and system that have reduced assembly conveyance equipment and flexibility of skateboard or vehicle routes to reduce capital investment and operational cost and create other advantages for OEMs or customers. This reduction of capital expense and operating expense offset the production cost of the "skateboard optimal" Body-on-Frame construction for OEMs converting existing structures or building new facilities to produce emission-free vehicles.

In a preferred embodiment of the present invention, remote or wireless control capable self-contained skateboards are controlled to follow preferred route mapping system through assembly processes to attach an unassembled, partially, or fully assembled top-hat to complete the build of a finished vehicle. Conveyance systems and equipment typical to transfer a top-hat through assembly processes can be eliminated or reduced substantially. Top-hat assembly processes to build complete vehicles can take place in multiple areas or locations on or off-site of the OEM and by multiple parties such as local suppliers or contractors. Skateboards can also be routed automatically through validation and distribution processes for delivery to other sites or to customers purchasing skateboards to assemble a top-hat of a different brand/model onto the purchased skateboard. As well, top-hats will be exchanged on skateboards for a variety of reasons such as, top-hat damaged beyond repair and skateboard is not, top-hat was not sellable due to late defect detected after vehicles were built (common in industry), top-hat was damaged after assembled or distributed and skateboard is still serviceable. The skateboard can be routed through various processes to remove and replace the damaged top-hat without conveyance or tow equipment.

Some skateboards will be produced that cannot be sold yet are functional. Examples include skateboards for durability testing which accumulate miles or aesthetic defects which are deemed customer relative. These skateboards can be adapted with part carriers to transfer parts internally or externally on controlled routes similar to those described in the assembly department. Additional features and benefits are further discussed in the sections below.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method and system of manufacturing emission free vehicles is disclosed. The present invention comprises steps of powering on a skateboard, limiting speed of vehicle by a production mode program, initiating control route for all vehicles, receiving inputs, transporting the skateboard to a paint shop location, attaching a cabin to the skateboard, utilizing one or more post marriage stationary lift station(s), transporting the cabin with skateboard, installing the cabin attached components, routing completed vehicles through vehicle test stations to confirm function and build quality and removing the production mode from the vehicle and vehicle can be driven to shipment area autonomously.

In one embodiment, the method and system of the present invention may include a skateboard that can be a battery powered self-contained skateboard with plurality of electronic components including Sensors, Lidar, Radar, GPS, Cameras, Ultra-sonic sensors, Potentiometers, locating/actuating sensors with their control units interfaced to central processor to establish communications. The central processor can be any type of microprocessor known in the art.

In some embodiments, the method and system of the present invention may include a step of providing a user interface Human-Machine Interface (HMI) located near work stations (which can be any station provided to work on vehicles) to act as an emergency stop through human interface.

DETAIL DESCRIPTIONS OF THE INVENTION

Figure 1:
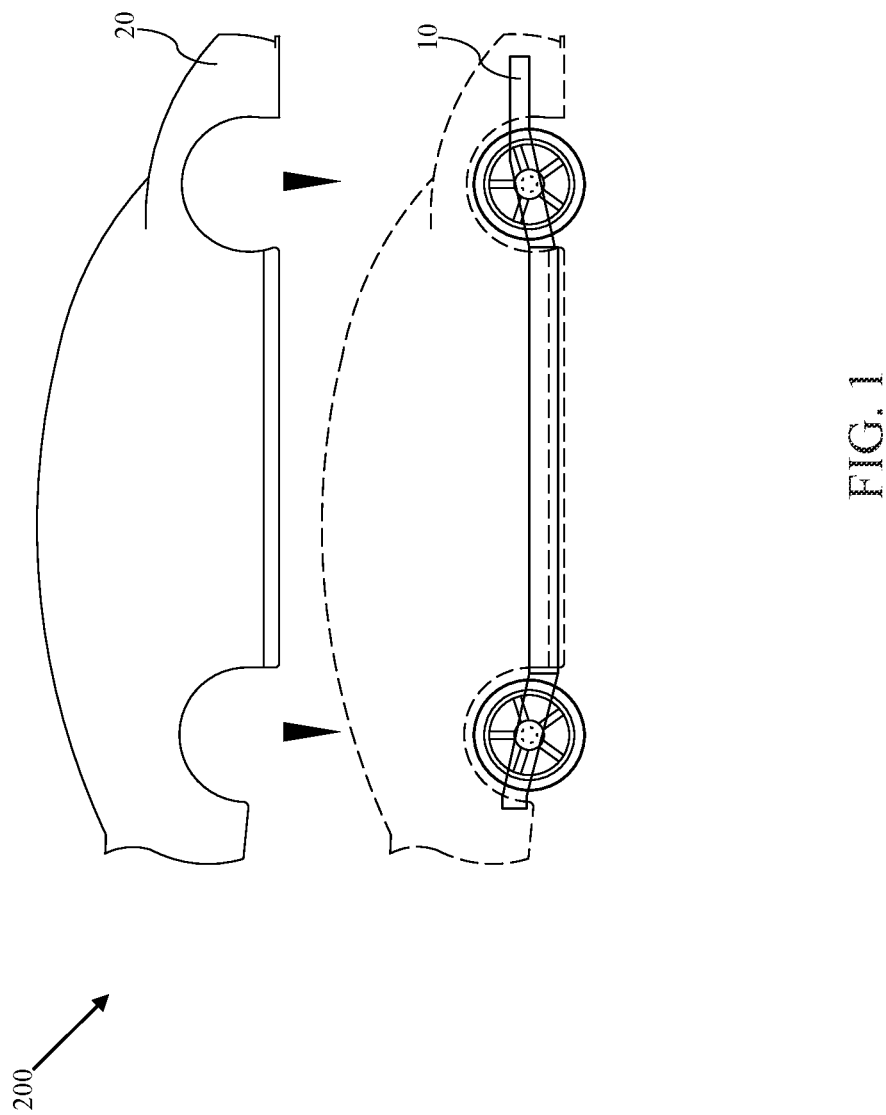
FIG. 1 is an example image illustrating the process of adding body to the skateboard/platform of the present invention.

All illustrations of the drawings are for the purpose of describing selected versions of the present invention and are not intended to limit the scope of the present invention.

The present invention provides a product integrated manufacturing method and system of emission free vehicles. The present invention operates with reduced assembly conveyance equipment and flexibility of skateboard or vehicle routes to reduce capital investment and operational cost and create other advantages for OEMs or customers. This reduction of capital expense and operating expense offset the production cost of the "skateboard optimal" Body-on-Frame construction for OEMs converting existing structures or building new facilities to produce emission-free vehicles. The emission free vehicles include, but not limited to, electric vehicle, hydrogen vehicle, and hybrid vehicle with dual modes of emission and emission free propulsion systems.

Unit Body construction, often referred to as Uni-Body or unitized construction is typical for passenger car production. Today, nearly all automobiles and crossovers use unitized construction with spot welded top-hat section structural members forming subframes for suspension and driveline attachment and the body structure itself providing support and rigidity. Unit construction over the years has been adopted as it is lighter, stiffer, and most importantly, lower in production cost. Yet, pick-up trucks are a different market. The US pick-up truck market is dominated by Asian and American producers who not only maintain the century-old Body-on-Frame system, but actively promote it as a selling proposition. While body on frame has its production cost disadvantages, it has the advantage of frame commonality for different top-hat configurations such as cabins for passenger cars or cross overs and different cab and bed configurations for pick-up trucks. It also allows commonality of cab structures to be built on the same or similar frame with only slight modifications having little impact on the production facilities producing the frame. By way of example Class I, II, and III pick-up trucks can be built with the same cab or hat.

A plurality of frame designs and materials exist for body-on-frame construction including ladder, X-section, perimeter frames. Skateboard designs often include integration of the battery and other components including protective materials and construction methods into frames to prevent component damage and for overall vehicle stiffening or crash protection.

Unit Body construction, by design integrates portions of the top-hat as structural, thus the body top-hat shell is created together with the skateboard in a common manufacturing space often referred to as the body shop or weld department then delivered to the assembly department where a series of processes marry suspension, propulsion systems and mount components such as axles, wheels, tires, batteries, seats, carpet, steering linkage, brake lines, electrical connections, HVAC systems, controls, ECU's, consoles, entertainment systems, wiring harnesses, automated driver assistance (ADAS) systems and a variety of other components to complete the build of a drivable vehicle.

The Unit Body is conveyed through the assembly department or processes using a variety of hangers, attachments, lifts, fixtures, hangers, overhead conveyors, floor conveyors, automated guided vehicles (AGVs) to position the Unit Body in proper location for part installation, testing, and other task performed manually or automatically by equipment. At some point relatively late in the assembly process, the Unit Body evolves into a vehicle that can be supported without conveyor fixtures and be conveyed on floor conveyors until further assembly enables the vehicle to be navigated or driven without conveyors. Only at that time vehicles can be removed from the line, progress through assembly, or to processes such as: shipping, post assembly repair areas, etc. without conveyors. Vehicles fully assembled with Autonomous features can be routed after final assembly driverless, while those without activated Autonomous features cannot. Driverless routing of finished Autonomous capable vehicles to and from designated locations could be performed today.

Some recent designs for BEVs are using various Body-on-Frame construction methods such as modified perimeter frames instead of Unit body construction. This construction method consists of two major components, the skateboard and the cabin or top-hat. The skateboard can consist of the frame, axles, wheels, suspension, horn, tires, brakes, steering linkage, electric control units with communication link, electric motors, battery, voltage connectors, drivetrain, wireless receiver devices, route/obstacle detection devices, and mechanical systems to connect and secure the skateboard to the cabin or top-hat. The top-hat or cabin consist of the body shell including doors, hood, trunk, roof, side panels, fenders, floor pan, seats, windows, door panels, carpet, instrument panel, entertainment systems, manual selectors, digital interfaces, center consoles, ADAS devices and other safety and comfort features. Conveyance systems are used in the assembly process for Body-on-Frame both for chassis and top-hat conveyance until such time as the vehicle is complete or near complete with the assembled top-hat integrated and connected to the chassis deeming the vehicle drivable.

Both Body on frame and Unit Body Assembly process conveyance equipment requires high amounts of initial capital investment, ongoing investments to adapt to geometry or weight changes of new vehicle model introductions and operation cost to maintain the conveyance related equipment. There is also end of life cycles for equipment which requires replacement. Weight changes can impact the building structure supporting overhead conveyance systems as well. Being able to produce a vehicle or top-hat through assembly processes without or with less conveyance equipment and with route flexibility would reduce investment and operating cost substantially.

Some BEV manufacturers are designing skateboards to include systems, sub systems, components, devices, wireless components, electric motors, suspension systems, batteries for energy storage, and controls required for the skateboard or partial skateboard to be self-contained in terms of ability to accelerate, decelerate, turn, or steer, brake, adjust height, or decelerate/stop, and route/obstacle detection.

As can be seen in FIG. 1, these skateboards (or platforms) 10, create a self-contained chassis or skateboard 10 which can be operated without a top-hat (or cabin) 20 or after the top-hat is attached and thus the skateboard 10 can be controlled to route through assembly processes to finalize the vehicle top-hat build without or with a substantial reduction of equipment such as conveyors, automatic guided vehicles and other mechanical or electrical conveyance systems used for transporting skateboards 10 or top-hats (or cabin) 20 for assembly.

In essence, these skateboards 10 could perform vehicle conveyance and could be operated or controlled to move wherever desired without being driven and with or without the top-hat 20 or final assembly interfaces to the top-hat 20 attached.

Skateboard development for BEVs or emission free vehicles can include, wireless steering, wireless braking, wireless acceleration/deceleration, horn, wireless height adjustment, and electronic/digital gateways, all which can be controlled by a main "brain" or computer/system with or without all of the actual customer ready finished vehicle devices installed and with or without the top-hat installed.

More-over, battery electric vehicles (BEV) and skateboards 10 are emissions-free and do not pose hazards associated with emission emitting vehicles when operated inside a building such as a vehicle assembly plant. Furthermore, components such as batteries, electric motors, suspension, and others are designed to mount within the integrated skateboard with said devices to create the possibility of a self-contained integrated operatable skateboard 10. An emission free, remote, or wireless controlled maneuverable self-contained skateboard 10 is an enabler for Product Integrated Manufacturing of Electric Vehicles.

Vehicle innovations and components, hardware and software are constantly evolving, many of which uniquely or combined enable or are compatible with artificial intelligence or programmed remote control of BEVs or vehicle skateboards. Examples of components include wireless control of acceleration, deceleration, braking, steering, electric motors, high-capacity batteries, control modules, electric control units, controls, digital interfaces, and devices for ADAS and autonomous vehicle development such as cameras, 360 cameras, radar, lidar, inertial MEMS/IMUs, ultrasonic sensors, gyroscopes and more. Software, hardware, firmware, programing, wireless signal emitters, routers, antennas, blue-tooth, GPS mapping, logistic body mapping and other control devices provide inputs through user interface or non-user intelligent interface onboard the vehicle or can be controlled remote of vehicle to operate vehicles or vehicle skateboards.

Today, such systems are commonly used for guidance of sophisticated equipment, technology, automated warehouses and even open (public) road driverless passenger and freight delivery vehicles.

Production facilities and surrounding properties are controlled routes which can be designed or changed with safety and operational priorities that exceed design feasibility or practicality for open road driverless vehicles. Such safety features and redundancies can include mechanical stops in work stations, mechanical guide paths to trap direction of wheels, interactive sensors which can be mounted on skateboard 10 and remain or be removed prior shipping, for production remote wireless control of skateboard components, total shut-down interlocks of vehicles not following route map or all vehicles in an area and so on.

Design features for safe and efficient operation of skateboards 10 in a controlled environment are endless and sensors can be integrated into the facilities environment to minimize skateboard component safety devices, example: floor scanner or overhead scanner. As such, the top-hat 20 is not required to control movement of the skateboard 10. Furthermore, OEMs can initially start with limited introduction of routes or assembly stations configured with less efficient redundancies for safety considerations and introduce more efficient guide paths with less equipment as the system matures and historical data validates performance indicators tracking faults, failures, or unintended movement.

By way of example: Initially, vehicles in a continuous flow conveyance arrangement or in-line could be limited to side access installations and front or rear of vehicle accessed installations could be performed in stop stations with the vehicle disabled from motion or while traversing sideways to transfer to an opposing parallel in-line non-conveyance route. If the vehicle in the continuous flow conveyance arrangement is using object sensors, close proximity work can be limited to the side of the vehicle.

If an object or person steps in front of the object sensor, the flow of the conveyance arrangement stops. Another example would be in-line cycled vehicles where-by vehicles are indexed to a stop station and assembly task are completed prior to indexing to the next station.

While indexing, if workers 17 are detected in vehicle path, interlocks could stop the vehicles through communication or engage mechanical stops and notify employee with audible and visual indication prior to presenting risk of human contact or restarting the indexing of vehicles.

As system data confirms safety and reliability, routes and redundant safety devices can be removed or reconfigured to improve efficiency. In a final state, by proper configuration, for vehicle travel, there is a limited need for redundant safety hardware in the factory as existing conveyors do not include such features with the exception of an emergency stop.

Notably, some low volume OEMs convey vehicles using Automatic Guided Vehicles (AGV) to transport the vehicle to assembly stop stations for installations or throughout portions of continuous lines for vehicle builds. In essence an integrated platform or skateboard 10 is an AGV and can be controlled as such to replace the need for an AGV. AGVs are similar to conveyance systems in that they are expensive and require upkeep. Furthermore, access to the bottom of the vehicle is interfered with which increase the need for additional equipment to separate and replace the vehicle from the AGV or limits areas where AGV's can be used when assembly or test processes require underbody access.

Conveyor systems are popular in high volume assembly plants as there are multiple stations to reduce work content in each station. The less work content performed in each station the less time required for process training. Assembly processes are often manual and require training to limit human error.

Limiting work content increases task repetition in an assembly station which reduces training curves and human error having a favorable outcome on build quality. Training employees work content of a station is never ending, the natural occurrence of attendance and turnover as well as new parts or models creates a known difficulty to maintain a trained workforce in the vast amount of varying assembly plant process steps.

To decrease work content, several AGVs would be required for mass production assembly lines to duplicate that of the amount of takt's or work areas manned on an assembly line.

Today, most AGVs are Laser-Guided vehicles (LGVs), and most mapping systems are local GPS for accuracy and flexibility. One embodiment of this invention method can be creating an AGV or LGV skateboard 10 by combining attributes of both the skateboard 10 and the AGV/LVG while minimizing redundancy of components, controls and guidance systems required to safely propel vehicles or skateboards through production processes in the facility, on-site or at remote sites for part or completed vehicle assembly.

Physical devises required which are not part of the skateboard 10 for end user (completed vehicles) or skateboard customers can be designed to remain with the skateboard 10 or removed and reused in the production of other vehicles such as any variety of navigation/obstacle detection sensors and the gateway connection of said sensors to the skateboard 10.

LGVs have evolved to detect physical signage or wireless signals/signage and send or receive commands to interact with other automation, equipment or humans needs specific to a workstation or part storage/distribution point along the physical guide path or digital map.

Logistic warehouse, material flow and production control systems in automotive facilities continuously optimize such systems and often standardize various areas or remote sites in terms of equipment, hardware, firmware, software, import local GPS route maps, etc., to reduce cost of engineering, equipment purchases, training and increase implementation speed.

Using proven technology and its developments over the past several decades combined with the self-contained capabilities of the skateboard 10 would create similar benefits for OEM production areas or sites and could also transfer to sites of customers purchasing such skateboards 10 creating a competitive edge/value.

Skateboard development strategies include building a skateboard 10 which can accept a variety of different cabins/top-hats 20 to create model variances for the OEM or companies by altering the cabin/top-hat 20 while keeping the skateboard 10 essentially the same.

The skateboard 10 can be assembled with all of its components in a skateboard shop 30. The skateboard 10 is being conveyed at this point and is not drivable. At the end of the skateboard shop 30, the skateboard 10 is operable on its own and can drive to quality check and testing areas.

Damaged skateboards 10 are prepared at a damaged skateboard preparation location 40 and finished skateboards 10 are either sent outbound to external sources 50 or it will drive to the top-hat paint shop 60 or other location to pick up the top-hat 20. Reducing skateboard variances reduces costly new tooling, research, development, safety testing and time associated with skateboard changes.

The skateboard 10 contains expensive components and requires capital investment for tooling new components and modifications inside production facilities when changed. Some OEMs share skateboard components and will purchase from or share complete skateboards with other OEMs to reduce aforementioned associated cost. Completed skateboards 10 can be routed to quality checks, test locations, distribution processes or top-hat build areas.

The skateboard 10 is driving itself across the shop with limited or no conveyance systems. The skateboard 10 can go down high takt lines 70 and reinsert back into the line.

The skateboard 10 can also drive off the line to a nearby or finger expansion building 80 to pick up supplier components. This reduces logistics of packing up the items, shipping them to the plant, unpacking, using forklifts, trucking, and line side delivery.

The end user or consumer distinguishes different vehicle brands more so by the cabins/top-hat 20 identifiable shape, brand, use purpose, interior trim level and features than it does the steel frame, motor, battery, wheels, or other skateboard related parts.

Benefits of utilizing the present invention are as follows. Vehicle skateboard 10 can travel without or with less conveyors or equipment through assembly for installation of cabin/top-hat 20 and top-hat components. Vehicle skateboard 10 can travel through assembly without or with substantially less mechanical equipment such as conveyors or other vehicle transport systems and equipment. Capital investment is greatly reduced due to cost of equipment and labor to install same. Major equipment reduction reduces or eliminates equipment maintenance, spare parts inventory, maintenance staff, utilities to power equipment, equipment failure repair downtime and production line stoppages related to equipment faults or failures.

Vehicles can travel continuous on lines 85 or enter stop stations for installations 90 and a mixture of both. Takt time or cycle times can be different in one or multiple stations depending on work content being installed. Takt time or cycle time can be changed in one or more stations without impacting other stations. Routes are flexible and storage buffers can be located line side or in remote locations.

Vehicle can be removed from line without stopping other vehicles being assembled upstream or downstream of vehicle being removed. This eliminates mass downtime typical of conveyance systems transferring cars through multiple manned assembly stations on a conveyor line or lines common to multiple vehicles. Vehicle failures, missing or damaged parts or special attention vehicles such as additional work content exceeding that of other vehicles required can be removed from the common line and returned after faults are resolved or added work content is completed.

Vehicle variances or different models can be run or introduced without modification to transport carriers (hangers), or other equipment used to secure vehicles to overhead conveyors, floor supported AGVs or other conveyance attachment devices.

New product launches (models) do not require or require less conveyor fixturing modifications to accommodate physical vehicle dimension changes or weight variances thus require less or no capital investment to integrate into the assembly line or stations.

Product changes and new models are common to vehicle manufacturers. New models or vehicles with new changes can be partially or fully built offline. New models or vehicles with changes can be built off-line in locations where assembly operations or parts have not reached matured quality or fitment levels to be performed in required takt time and returned to be built in-line for areas where takt time can be maintained within that of other vehicles being produced. Vehicles can be routed to locations close to or where parts have been produced to avoid packaging, racks, containers, line side deliveries, double handling, logistic operators, logistic equipment, equipment maintenance, damage from handling or transporting and reduce part storage space (building size/utilities).

Vehicles can be routed to suppliers providing parts and parts can be stored or assembled into vehicles at part suppliers located inside the facility or outside the facility where vehicles are being manufactured. Employment can be deferred to supplier for expertise and to reduce workforce of OEM. The elimination of equipment for conveyance reduces the infrastructure load requirements to support the weight of the equipment and at times the hangers and car bodies being conveyed (overhead conveyors carrying vehicles). This reduces capital investment for robust building structures and the time to install an assembly area. Equipment lifetime is extended as the skateboard 10 is essentially the conveyor thus wear and tear causing replacement is eliminated to a large degree.

In the preferred embodiment, vehicle skateboard 10 can travel to test equipment, packaging and or direct to shipment point for transfer to other areas or customers of skateboard 10 without or with partial cabin/top-hat 20. Skateboard 10 can be routed to testing equipment, inspection, packaging, delivery transportation, facility for assembly by external customer, contract builder, supplier or routed for internal assembly.

Self-contained skateboard 10 with wireless steering, acceleration, deceleration, and braking can be controlled without or with less installed autonomous driving systems or ADAS. This eliminates need for addition of certain ADAS systems, devices, and controls not installed and operational until cabin or top-hat 20 is installed.

ADAS and autonomous enabling sensors are often mounted in bumpers on mirrors, roofs of cars, in front grill or glass, rear trunk areas, etc. and not in the skateboard 10. Skateboard 10 can be routed without drivers through functional test for all systems contained in skateboard 10 prior to assembly of top-hat 20 to avoid or reduce amount of defects after cabin/top-hat assembly. Skateboards 10 with defects can be routed for repairs and returned to test or other areas until skateboard is deemed ready for intended use, or next step in the manufacturing or delivery process.

In the preferred embodiment, skateboard 10 is manufactured in separate process and or process area. Until the skateboard 10 is self-contained or controllable (moveable), more traditional manufacturing conveyance or part movement practices are utilized and may include fixtures, overhead conveyors, floor conveyors, material handling equipment, lifts, AGVs, securing devices, clamps, handling robots, motorized or manual carts, etc. Once the skateboard 10 is self-contained and controllable, the skateboard 10 can be routed on a hard surface 100 such as a concrete floor.

Figure 4:
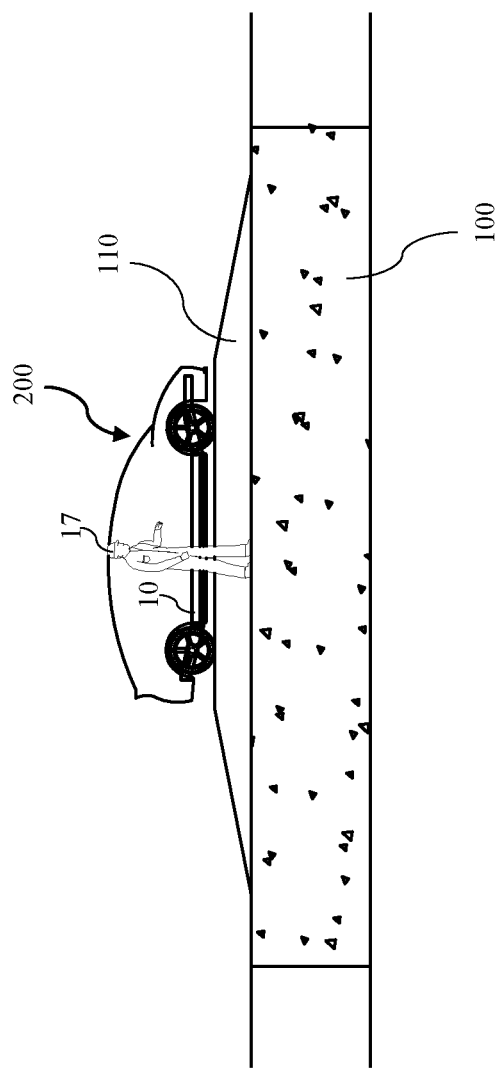
FIG. 4 is an example ramp image illustrating the different variances for skateboard/platform height required for the ergonomic installation of the present invention.

As can be seen in FIG. 4, ramps 110 can be installed permanent or temporary in existence and from a variety of suitable materials. Ramps 110 can vary in height, width, and length. Ramps 110 can be adjustable. Ramps 110 are intended to elevate the vehicle 200 or assembler in a continuous line 85 or stop station line operation 90 to allow optimal reach to areas of the vehicle 200 where parts are being manually or automatically installed. As well, in some embodiments, pits below the floor surface which the skateboard tires are traveling on can be installed below or beside the vehicle 200 to access the underside of the skateboard 10 or to adjust height of the area being worked on. Pits can also be designed to be adjustable.

The skateboard 10 in many areas will travel on the floor under its own power and guidance, however, as with conventional assembly practices, the skateboard 10 can be conveyed by mechanical conveyors or AGVs and elevated with mechanical lifts when desired or required.

The skateboard 10 can interact with other conveyance or elevation changing devices. Skateboard 10 can drive over a mechanical lift and stop or the skateboard 10 can position over an AGV, be transferred, and positioned multiple times in height, then drive off the AGV.

Buffers are utilized for various reasons in manufacturing, such as reducing capital intensive equipment for testing or separating long length conveyors to avoid downtime in a single process area from stopping every station on the line. Buffering can be achieved by routing a skateboard or skateboards 10 to various areas and returning them to the production line at the desired time.

Figure 3:
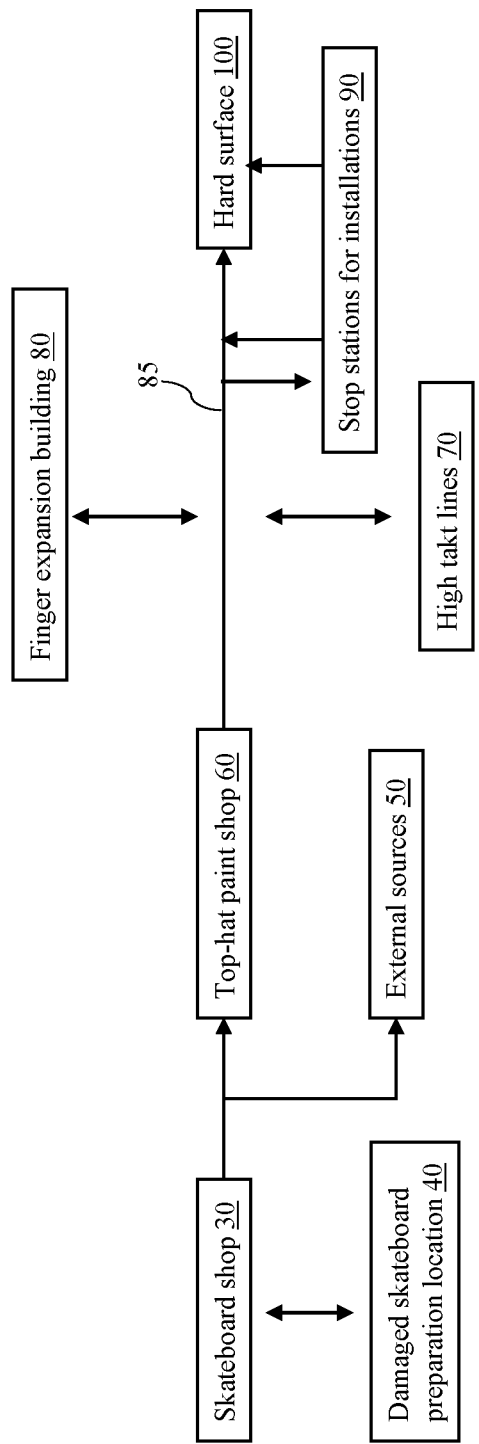
FIG. 3 is a block diagram illustrating the vehicle assembly process of the present invention.

As can be seen in FIG. 3, skateboard 10 travels through assembly lines 85 to allow assembly of cabin 20 and components and at some point, a completed vehicle 200 or near completed vehicle 200 results.

In some embodiments, the completed or nearly completed vehicle 200 can continue to test areas, repair areas, inspection areas or other areas and added components such as cameras, sensors, radars, lidar and other advanced driver assistance systems (ADAS), or autonomous features can be utilized in combination to safely convey or test the assembled car, some or all features can be ignored until activation is desired.

Figure 2:
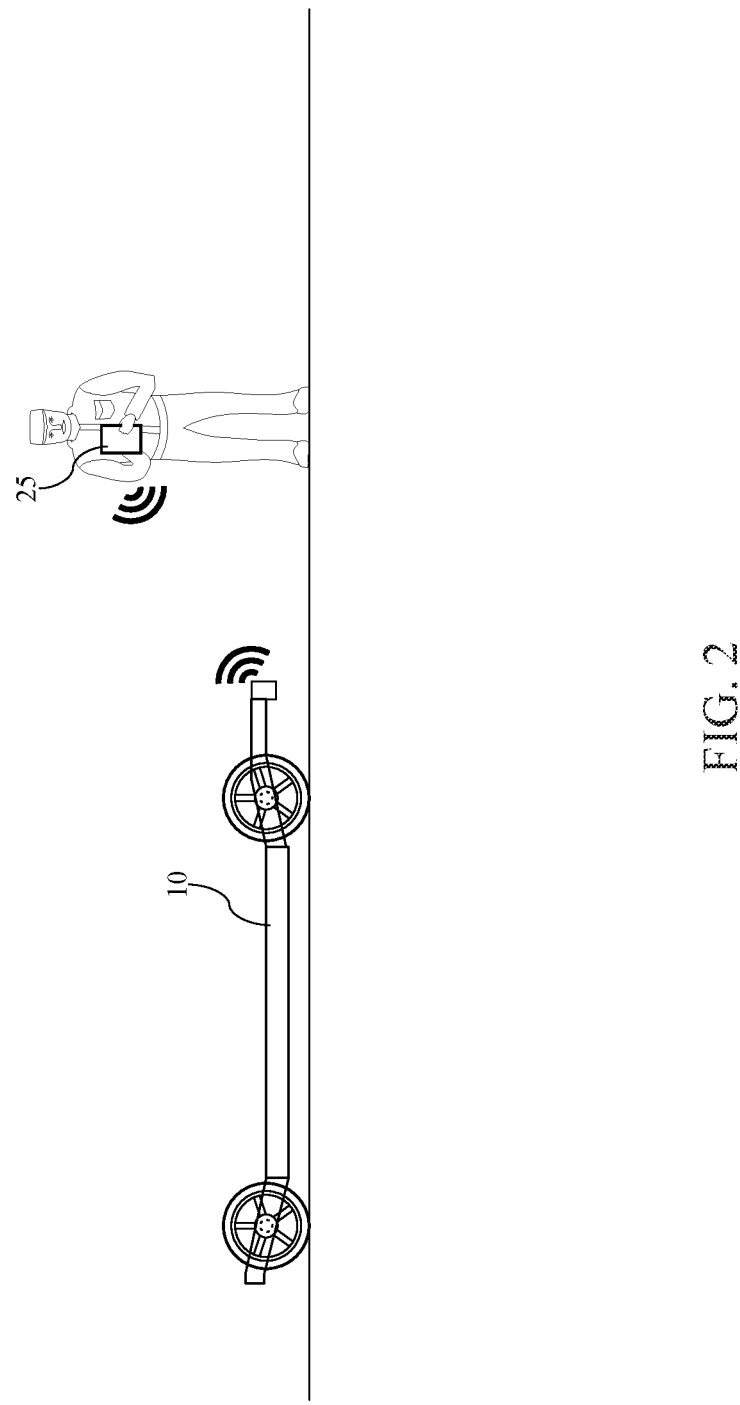
FIG. 2 is an example image illustrating the process of controlling the skateboard/platform of the present invention using a wireless device.

The control system for routing vehicles 200 or "brain" can coordinate groups of skateboards 10 and vehicles 200, partial groups, or separate vehicles 200. As can be seen in FIG. 2, as well a handheld device 25 such as a remote controller or phone or tablet can be used to operate a vehicle 200 when required.

The skateboard 10 can be controlled in a "production mode" until customer readied. Production modes are common in vehicle manufacturing factories to limit the speed of vehicles 200 and can engage certain safety features as they are added to vehicles 200. Assembly lines operating with 60 assembled Vehicles Per Hour are running about 0.25 miles per hour, while assembly lines producing at 30 assembled Vehicles Per Hour are running about 0.125 miles per hour. Interior routes for finished vehicles 200 traveling to other areas can be limited at higher "production mode" speed limits or without limits at all.

Production mode limits can be controlled by software or with mechanical limits, but common practice is by means of software. Finished vehicles 200 can be driven or driverless and still be speed limited by the use of software limiting speed controls referred to before as "production mode." Such software can be any software known in the art designed to perform such function.

As the controlled skateboard 10 and completed vehicles 200 progress through various level of build completion, devices added during assembly can be controlled or ignored to route the vehicle 200 through production or testing.

Manufacturers may choose to operate with or without mechanical conveyance for portions of the vehicle build. By way of example, only transporting the skateboard 10 to the cabin install assembly location or skateboard loading area for shipment to skateboard purchasing customers. However, manufacturers may capitalize on product integrated manufacturing by utilizing every possible route without mechanical conveyance from point of skateboard complete through nearly all or all vehicles build, rework and test areas, as well as delivery to outbound logistics or even end user customers/ consumers.

Figure 5:
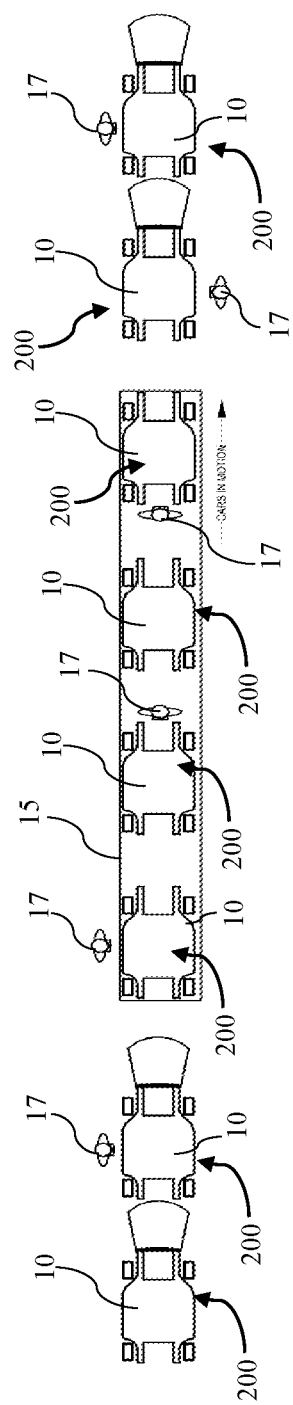
FIG. 5 is an example image illustrating the conveyor systems and safety zones of the present invention.

As can be seen in FIG. 5, in some embodiments, skateboard 10 or partially completed vehicles 200 and completed vehicles 200 can be transferred to in-line 15 (which can be a stop stations for installations 90)(or any random assembly areas) and stopped for installation of parts, components, or other interactions. When stopped, skateboard 10 and vehicle devices can be energized or deenergized then restarted to transfer to the next station or location. Skateboard 10 or partially completed and completed vehicles 200 can run continuously, typical of a conventional conveyor line.

In one embodiment, the method of the present invention can include steps of:
  routing the skateboard to a location after paint shop or a location near the beginning of the assembly line to pick up a painted cabin to the skateboard;
  providing lift stations that are located downstream of the marriage station (assembly line) to perform any underbody work that needs completed following the marriage station (assembly line) while the skateboard travels at floor level throughout the assembly processes without the need for conventional conveyor systems;
  changing elevation of the assembly line when needed by changing the floor such as adding a ramp for the car to travel up, forward and then travel back down to floor level, wherein changing elevation is done in stationary positions with lifts;
  transferring skateboards with the cabin attached onto conveyors;

utilizing path guide rails or floor mounted light curtains to prevent personnel or property risk.

Figure 6:
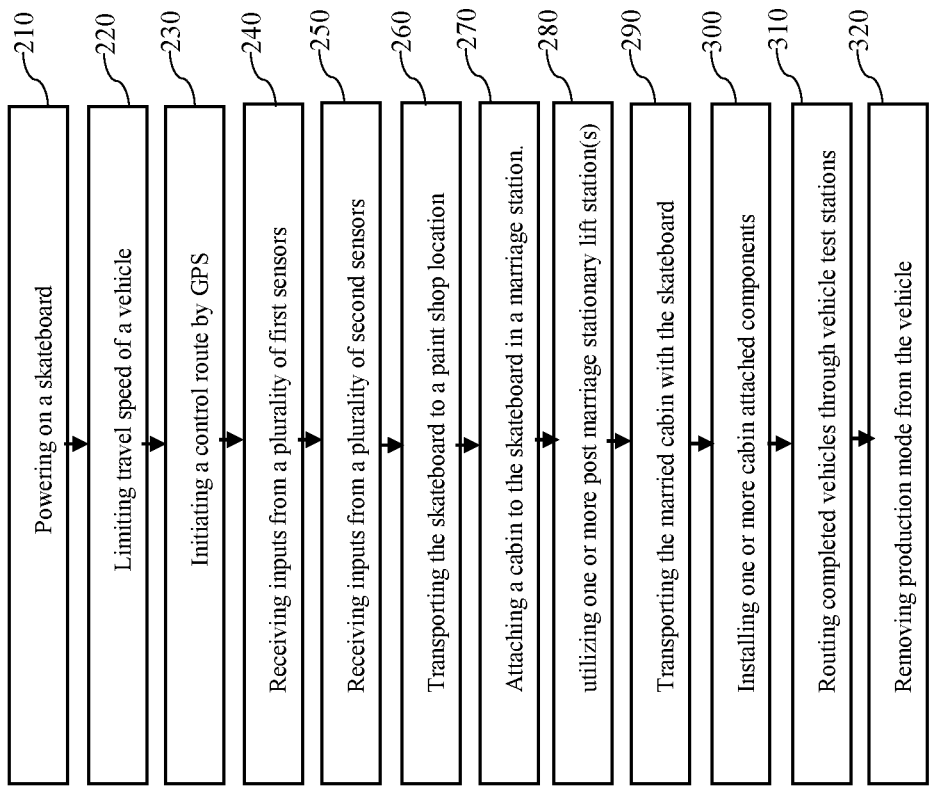
FIG. 6 is a flow diagram illustrating one embodiment the method of the present invention.

In one embodiment, as shown in FIG. 6, the present invention provides a method and system comprising steps of:

powering on a skateboard 10 at 210, wherein the skateboard 10 can be a battery powered self-contained skateboard 10 with plurality of electronic components including Sensors, Lidar, Radar, GPS, Cameras, Ultrasonic sensors, Potentiometers, locating/actuating sensors with their control units interfaced to central processor to establish communications, limiting travel speed (or transporting speed) of a vehicle 200 by a production mode program attached to the vehicle 200 at 220, (wherein the vehicle 200 may include the skateboard 10, wheels, and other vehicle parts known in the art)

initiating a control route for all vehicles 200 by GPS at 230, (wherein the control route may be the route/path through which the vehicles can be transported in the assembly line)

receiving inputs from a plurality of first sensors at 240 (wherein the first sensors are sensors that may be located in suitable places and configured to provide signals to control various devices). For example, the present invention can include steps of receiving inputs from sensors to make decisive outputs to control brake system, steering, acceleration, deceleration, motors and actuators to propel and steer unit through desired production route;

receiving inputs from a plurality of second sensors at 250 (wherein the second sensors are sensors that may be located in suitable places and configured to provide signals to keep distance between vehicles). For example, the present invention can include steps of receiving inputs from vehicle sensors, factory mounted digital signage or light curtains to keep distance from other vehicles 200 in the assembly line or detect obstacles in route path and can output signals to avoid contact of obstacles in the rout path, in some embodiments, the system of the present invention may include a user interface HMI located near work stations to act as an emergency stop through human interface, transporting the skateboard 10 to a paint shop location of the top-hat paint shop 60 (paint shop) at 260, wherein the paint shop location can be an exit of the paint shop 60 or an entrance to the paint shop 60, (wherein the top-hat paint shop 60 may include painting equipment for painting parts of the vehicle), attaching a cabin 20 (unassembled) to the skateboard 10 in a marriage station at 270. The marriage station (where the cabin 20 in assembled with the skateboard 10) is typically later in existing plants and would need to be relocated. In new plants it can be installed in the appropriate location during equipment installation. In the present invention, the marriage station can be one of the stop stations for installations 90 (which may be provided for installing various vehicle parts).

In some embodiments, the method may include utilizing one or more post marriage stationary lift station(s) at 280 or overhead system designed to complete underbody work if required. The post marriage stationary lift station(s) can also be one or more stations of the stop stations for installations 90.

The method and system further include a step of transporting the married cabin (assembled cabin) 20 with skateboard 10 at 290 through the assembly line 85 in continuous flow or through stop stations 90 or combination of both to complete assembly of the vehicle.

The method and system further include a step of installing one or more cabin-attached-components at 300. The cabin-attached-components can include seats, glass, interior consoles, door panels, carpet, bumpers, etc. At 310, the method and system further include a step of routing completed vehicles 200 through vehicle test stations to confirm function and build quality such as water leak booths or dynamic drive train test stands, etc.

At 320, the method and system further include a step of removing the production mode from the vehicle 200 and vehicle 200 can be driven or relocate to shipment area autonomously.

In future, using existing skateboard and changing the top-hat based on individual preference for styling, updating, or refreshing will be viable. Fleet operations such as rental fleets will have the ability to fulfill cyclical vehicle style or use needs by changing top-hats to align with user demand. In this use case, the ability to remotely control the skateboard reduces the need for equipment to convey, toe or mechanically transfer the skateboard to the top-hat exchange location.

Although the invention has been explained in relation to its preferred embodiment, it is to be understood that many other possible modifications and variations can be made without departing from the spirit and scope of the invention.

What is claimed is:

1. Method comprising:
 initiating a control route for a vehicle by GPS; receiving inputs from a plurality of first sensors; receiving inputs from a plurality of second sensors; transporting a skateboard to a paint shop location; attaching a cabin to the skateboard in a marriage station; utilizing one or more post marriage stationary lift stations to complete underbody work; transporting the cabin with the skateboard through an assembly line in continuous flow to complete assembly of the vehicle;
 powering on the skateboard;
 limiting travel speed of the vehicle by a production mode program attached to the vehicle;
 installing one or more cabin attached components; routing the vehicle through vehicle test stations; removing the production mode program from the vehicle; and relocating the vehicle to a shipment area.

2. He method as claimed in claim 1, wherein the skateboard is a battery powered self-contained skateboard with a plurality of electronic components including lidars, radars, GPS, cameras, ultra-sonic sensors, potentiometers, locating sensors, and actuating sensors with a control unit of each of the plurality of electronic components interfaced to a central processor to establish communications.

3. He method as claimed in claim 1, wherein the method includes a step of providing a user interface HMI located near work stations to act as an emergency stop through a human interface.

4. He method as claimed in claim 1, wherein the method includes utilizing an overhead system to complete underbody work.

5. He method as claimed in claim 1, wherein the paint shop location is an exit of the paint shop or entrance to the assembly line.

6. The method as claimed in claim 1, wherein the paint shop location is an entrance to the assembly line.

7. The method as claimed in claim 1, wherein the second sensors include vehicle sensors to keep distance between each vehicles.

8. Method comprising: initiating a control route for a vehicle by GPS; receiving inputs from a plurality of first sensors; receiving inputs from a plurality of second sensors; transporting a skateboard to a paint shop location; attaching a cabin to the skateboard in a marriage station; utilizing one or more post marriage stationary lift stations to complete underbody work; transporting the cabin with the skateboard through stop stations to complete assembly of the vehicle;
  powering on the skateboard;
    limiting travel speed of the vehicle by a production mode program attached to the vehicle;
    installing one or more cabin attached components; routing the vehicle through vehicle test stations; removing the production mode program from the vehicle; and relocating the vehicle to a shipment area.

9. He method as claimed in claim 8, wherein the skateboard is a battery powered self-contained skateboard with a plurality of electronic components including lidars, radars, GPS, cameras, ultra-sonic sensors, potentiometers, locating sensors, and actuating sensors with a control unit of each of the plurality of electronic components interfaced to a central processor to establish communications.

10. He method as claimed in claim 8, wherein the method includes a step of providing a user interface HMI located near work stations to act as an emergency stop through a human interface.

11. He method as claimed in claim 8, wherein the method includes utilizing an overhead system to complete underbody work.

12. The method as claimed in claim 8, wherein the paint shop location is an exit of the paint shop or entrance to the assembly line.

13. The method as claimed in claim 8, wherein the paint shop location is an entrance to the assembly line.

14. He method as claimed in claim 8, wherein the second sensors include vehicle sensors to keep distance from other vehicles.

15. Method comprising: initiating a control route for a vehicle by GPS; receiving inputs from a plurality of first sensors; receiving inputs from a plurality of second sensors; transporting a skateboard to a paint shop location; attaching a cabin to the skateboard in a marriage station; utilizing one or more post marriage stationary lift stations to complete underbody work; transporting the cabin with the skateboard through the assembly line in continuous flow and through stop stations to complete assembly of the vehicle;
  powering on the skateboard;
    limiting travel speed of the vehicle by a production mode program attached to the vehicle;
    installing one or more cabin attached components; routing the vehicle through vehicle test stations; removing the production mode program from the vehicle; and relocating the vehicle to a shipment area.

16. He method as claimed in claim 15, wherein the skateboard is a battery powered self-contained skateboard with a plurality of electronic components including lidars, radars, GPS, cameras, ultra-sonic sensors, potentiometers, locating sensors, and actuating sensors with a control unit of each of the plurality of electronic components interfaced to a central processor to establish communications.

17. He method as claimed in claim 15, wherein the method includes a step of providing a user interface HMI located near work stations to act as an emergency stop through a human interface.

18. He method as claimed in claim 15, wherein the method includes utilizing an overhead system to complete underbody work.

19. The method as claimed in claim 15, wherein the paint shop location is an exit of the paint shop or entrance to the assembly line.

20. The method as claimed in claim 15, wherein the paint shop location is an entrance to the assembly line.

* * * * *